Patented Oct. 26, 1954

2,692,815

UNITED STATES PATENT OFFICE 2,692,815

PROCESS FOR REMOVING AN ALKALINE-EARTH METAL COMPOUND DUST

Felix Walter, Koln-Klettenberg, Germany, assignor to Knapsack-Griesheim Aktiengesellschaft, a corporation of Germany No Drawing. Application October 2, 1950, Serial No. 188,077

Claims priority, application Germany October 10, 1949

4 Claims. (Cl. 23—2)

The present invention relates to a process for removing alkaline-earth metal compound dust, such as lime, from gases, more particularly it relates to the removal of such dust from gases as are obtained during the decomposition of calcium carbide by means of water with the simultaneous production of dry calcium hydroxide, which gases contain, besides raw acetylene, steam and lime dust, or from gases as are produced during the formation of calcium carbide in electric furnaces, which gases contain, besides carbon monoxide, lime and carbon in the form of dust.

The invention consists, among others, in that a small quantity of acid, preferably hydrochloric acid, is added to the water for the washing out and the direct cooling of the raw gas in a cooling tower equipped with packing elements.

In the decomposition of calcium carbide with water while producing dry calcium hydroxide a hot, raw acetylene with a high steam and lime dust content occurs, which is first freed of a great part of the lime dust carried over in an empty washing tower by irrigation with lime water conducted in cycle. Then, in order to remove the remaining quantities of dust and for cooling down, the raw gas is conveyed into a cooling tower equipped with packing elements which are treated directly with fresh water. By this means the gas is freed from dust and a good cooling effect is achieved, so that the gas leaves the cooling tower with a temperature approaching that of the fresh water, and the washing water with a temperature approaching that of the entering gas, about 85–90° C.

But the disadvantage of this process lies in that the lime dust carried over with the raw gas settles particularly on the lowest layer of the packing element column and the grating situated beneath it, and gradually clogs up the tower, so that after a comparatively short period, i. e., after about 3–4 weeks of continual operation, the tower must be cleaned out, whereby the decomposition apparatus also becomes idle. For owing to reasons of safety and operating expediency a reserve cooling tower is generally dispensed with.

In the manufacture of carbide in covered or closed-in furnaces, a gas is obtained which consists mainly of carbon monoxide and is heavily burdened with lime, magnesia, coal dust, etc., and this is therefore freed from the dust carried over in a similar manner as described above. Here also stoppages often occur in washing and cooling apparatuses equipped with packing elements, so that they have to be cleaned out after comparatively short periods of operation, resulting in interruptions in operation and undesirable expense.

In accordance with the present invention the said disadvantages are overcome by adding a small quantity of acid, preferably hydrochloric acid, continually to the washing water for the cooling tower equipped with packing elements, whereby the materials with an alkaline earth metal compound content which are deposited on the packing elements and the grating are continually dissolved.

The quantity of acid to be applied depends upon the quantity of dust carried over with the gas. For example, with an hourly decomposition of 6 tons of carbide, corresponding to 1,500 cubic metres of acetylene about 2–3 kg. of hydrochloric acid 100% are required. It is expedient to add such a quantity of dilute hydrochloric acid to the cooling water that the water discharged from the cooling tower is in general a very weakly alkaline reaction, and only transiently of weak acid reaction.

It has been found advantageous to add the hydrochloric acid to the cooling water only in great dilution, e. g., a concentration of about 0.1–1 g. per litre, since it can be more easily dosed in this dilution. Thus only a very strongly diluted hydrochloric acid reaches the cooling tower, and the cost for this acid is comparatively small.

A particular advantage is achieved, if the cooling tower equipped with packing elements is arranged directly over an empty washing tower, and the water discharged from the cooling tower is well distributed over the whole cross section of the empty tower by suitable devices. Instead of the cooling tower equipped with packing elements, it is also possible to use a rotating drum fed with packing elements, with an empty washing tower situated beneath it, into which the water flows from the drum, whereby this is well distributed over the whole cross section of the empty tower. In the case of raw acetylene produced by decomposition of calcium carbide while producing dry calcium hydroxide, it is also possible to use the waste water occurring in the chemical gas cleaning with dilute aqueous chlorine solution instead of the dilute hydrochloric acid, such waste water containing a small quantity of hydrochloric acid. This method also offers the advantage that the acetylene dissolved in the used chlorine water—1 part water dissolves about 1 part acetylene—can be regained by the heating up of the water in the cooling apparatus; the water leaves the apparatus virtually free from acetylene, and at the same time the cost of the hydrochloric acid is saved.

Besides other impurities, the raw acetylene produced by the decomposition of calcium carbide while producing dry calcium hydroxide also contains large quantities of hydrogen sulphide; this impurity is mostly removed in an empty washing tower, situated before the cooling tower and equipped with distributing elements, through cycling water containing calcium hydroxide. Particularly in this case it is very expedient to arrange the cooling tower directly over the empty washing tower. By this means a gas conduction mostly arranged between the two towers, which gradually clogs and offers great resistance to the acetylene containing a large quantity of steam is dispensed with. The hot water leaving the cooling tower can then flow in well distributed form directly into the empty washing tower, by which means either a better washing out of the raw gas is effected, or a part of the water can be saved for the first washing tower. In addition to this it is possible to operate the dry decomposition apparatus continually even after an operating period of 8–10 months with maximum capacity, thus representing a great technical advantage and at the same time avoiding many interruptions in operation and high cleaning costs.

Stoppage of the washing and cooling towers fed with filling elements can be avoided for a long time in a similar manner also in the cleaning of the waste gases discharged from a covered or closed-in carbide oven. For this purpose it is best to use only dilute hydrochloric acid and not the waste water with a hydrochloric acid content occurring during the chemical cleaning of raw acetylene.

I claim:

1. A process for removing an alkaline-earth metal compound dust from a hot gas of the group consisting of raw acetylene and carbon monoxide, which comprises washing such a gas and cooling it in a confined space containing packing elements by direct contact with water containing very diluted hydrochloric acid in an amount barely sufficient to dissolve the alkaline-earth metal compound deposited within said confined space.

2. A process as claimed in claim 1 wherein the water used for cooling contains hydrochloric acid in a concentration of about 0.1 to about 1 gram per liter.

3. A continuous process for removing dust from a hot gas containing lime dust and selected from the group consisting of raw acetylene and carbon monoxide which comprises washing a stream of such a gas and cooling it in a confined space containing packing elements by direct contact with a well distributed countercurrent stream of water containing very diluted hydrochloric acid in an amount barely sufficient to dissolve the lime dust deposited within said confined space.

4. A continuous process for removing dust from a hot gas containing lime dust and selected from the group consisting of raw acetylene and carbon monoxide, which comprises washing a stream of such a gas in an empty chamber and then cooling it in a chamber containing packing elements by direct contact with a well distributed countercurrent gravity flow of water containing hydrochloric acid in a concentration of about 0.1 to about 1 gram per liter and in an amount barely sufficient to dissolve the lime dust deposited in the cooling chamber.

References Cited in the file of this patent

UNITED STATES PATENTS

| Number | Name | Date |
|---|---|---|
| 647,295 | Ernst et al. | Apr. 10, 1900 |

FOREIGN PATENTS

| Number | Country | Date |
|---|---|---|
| 11,706 | Great Britain | of 1896 |